United States Patent
Chiu

(10) Patent No.: US 7,248,627 B2
(45) Date of Patent: Jul. 24, 2007

(54) METHOD AND APPARATUS FOR ESTIMATING THE LINK QUALITY OF A COMMUNICATION CHANNEL

(75) Inventor: Mao-Ching Chiu, Hsinchu (TW)

(73) Assignee: Mediatek Incorporation, Hsin-Chu (TW)

( * ) Notice: Subject to any disclaimer, the term of this patent is extended or adjusted under 35 U.S.C. 154(b) by 743 days.

(21) Appl. No.: 10/632,902

(22) Filed: Aug. 4, 2003

(65) Prior Publication Data
US 2005/0031028 A1 Feb. 10, 2005

(51) Int. Cl.
*H04B 3/46* (2006.01)
*H04B 17/00* (2006.01)

(52) U.S. Cl. ............ 375/224; 375/132; 375/136; 375/226; 375/227; 375/346; 455/13.4

(58) Field of Classification Search .......... 375/224, 375/226, 227, 132, 136, 346; 455/13.4
See application file for complete search history.

(56) References Cited

U.S. PATENT DOCUMENTS

| | | | |
|---|---|---|---|
| 5,924,015 A * | 7/1999 | Garrison et al. | 455/13.4 |
| 7,076,001 B2 * | 7/2006 | Beadle et al. | 375/316 |
| 2003/0048800 A1 * | 3/2003 | Kilfoyle et al. | 370/441 |

\* cited by examiner

*Primary Examiner*—Dac Ha
*Assistant Examiner*—Ted M. Wang
(74) *Attorney, Agent, or Firm*—Thomas, Kayden, Horstemeyer & Risley

(57) ABSTRACT

A link quality estimating method and apparatus adopts a fading value to modify an estimated link quality of a channel thereby obtaining a measure being very close to the real link quality. The method is implemented by utilizing two sequentially received long training symbols to derive two sets of subcarrier gain values $H_{k,1}$ and $H_{k,2}$. Based on the subcarrier gain values $H_{k,1}$ and $H_{k,2}$, parameters representing the estimated channel gain value (A), the fading value (F) and the noise quantity (B) of the channel are all calculable. With these parameters, the link quality (LQ) of said communication channel is derived.

13 Claims, 2 Drawing Sheets

METHOD AND APPARATUS FOR ESTIMATING THE LINK QUALITY OF A COMMUNICATION CHANNEL

BACKGROUND OF THE INVENTION

1. Field of the Invention

The present invention relates to a method and an apparatus for estimating the link quality of a channel, and more particularly to a method and an apparatus to utilize a fading value to modify an estimated link quality thereby deriving a quality measure being close to the actual quality of said channel.

2. Description of Related Art

In a wireless communication system, the link quality of a channel is an essential reference parameter whether for the transmission party or the reception party. For example, if the link quality between an access point and plural nodes covered by said access point is able to be precisely measured, the MAC layer (media access control layer) of said access point can properly switch the comminuting channel among the plural nodes or decrease/increase the signal transmission rate.

Basically, link quality is determined upon the measured signal-to-noise ration (SNR). Although the parameter is useful in evaluating the link quality of a communication channel, it has been found that the precise link quality is hard to be represented merely by an SNR. Some additional factors, such as the fading factor resulted from the multipath, may possibly affect the accuracy of the measured quality.

Accordingly, it is desirable to provide a new method and an apparatus for estimating a link quality of a communication channel.

SUMMARY OF THE INVENTION

An objective of the present invention is to provide a novel method and an apparatus for estimating the link quality of a communication channel, where the fading factor caused by the multipath transmission is addressed to modify the estimated quality value.

To achieve aforementioned objective, the method in accordance with the present invention mainly comprises the steps of:

estimating a noise quantity (B) of said channel based on two long training symbols contained in a received OFDM packet transmitted over said channel;

summing the absolute values of estimated subcarrier gain values ($H_k$) of said subcarriers thereby obtaining an estimated channel gain value (A) of said channel;

estimating a fading value (F) of said channel based on said estimated subcarrier gain values; and subtracting said fading value (F) from said estimated channel gain value to derive a channel gain measure (A-F), whereby the link quality of said channel is defined as a ratio of the actual channel gain value to the noise quantity (B).

Other objects, advantages and novel features of the invention will become more apparent from the following detailed description when taken in conjunction with the accompanying drawings.

DETAILED DESCRIPTION OF PREFERRED EMBODIMENT

The present invention is to provide a novel method and an apparatus for estimating the link quality of a communication channel over which OFDM (orthogonal frequency division multiplexing) packets are transmitted. As well known in the art, the head of an OFDM packet includes a PLCP (physical layer convergence protocol) segment in which ten short symbols and two long symbols are contained. In the present invention, the two long training symbols are utilized to estimate some parameters for determining the link quality. It should be noted that said channel is deemed as being composed of N subcarriers and each of which represents a specific frequency. For instance, the 802.11a channel has a total of 64 subcarriers, wherein 52 of the 64 subcarriers are used the most.

Figure 1:
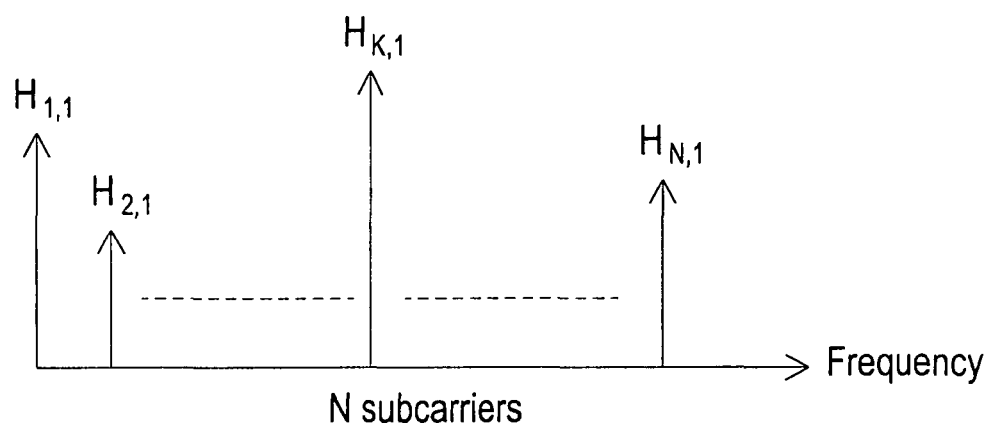
FIG. 1 shows gain values of all subcarriers according to the first long training symbol of the present invention.
Figure 2:
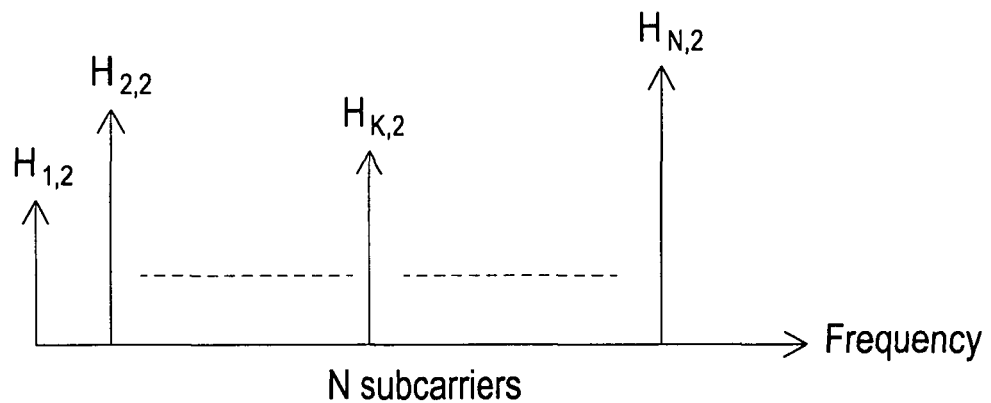
FIG. 2 shows gain values of all subcarriers according to the second long training symbol of the present invention.

With reference to FIGS. 1 and 2, when said two long training symbols of an OFDM packet are sequentially transmitted over the channel, gain values of each subcarrier is measured. The subcarrier gain values are designated with ($H_{1,1} \ldots H_{N,1}$) and ($H_{1,2} \ldots H_{N,2}$). The first suffix (1 to N) indicates the ordinal of the subcarriers and the second suffix (1 or 2) represents that the measured subcarrier gain value is observed based on the first or second long training symbol. For an ideal communication channel, there should be no noise and thus the measured subcarrier gain values ($H_{1,1} \ldots H_{N,1}$) upon the first long training symbol are respectively identical with the measured subcarrier gain values ($H_{1,2} \ldots H_{N,2}$) upon the second long training symbol. Accordingly, it is realized that the noise quantity is measurable in an actual channel while a difference exists between two measured subcarrier gain values ($H_{k,1}$ and $H_{k,2}$) as shown in FIGS. 1 and 2.

Therefore, the noise quantity (B) of said channel is estimated by summing the absolute values of the all difference values between two respective subcarrier gain values ($H_{k,1}$ and $H_{k,2}$), as represented by the relationship $$B = \sum_{k=1}^{N} |H_{k,1} - H_{k,2}|.$$

Figure 3:
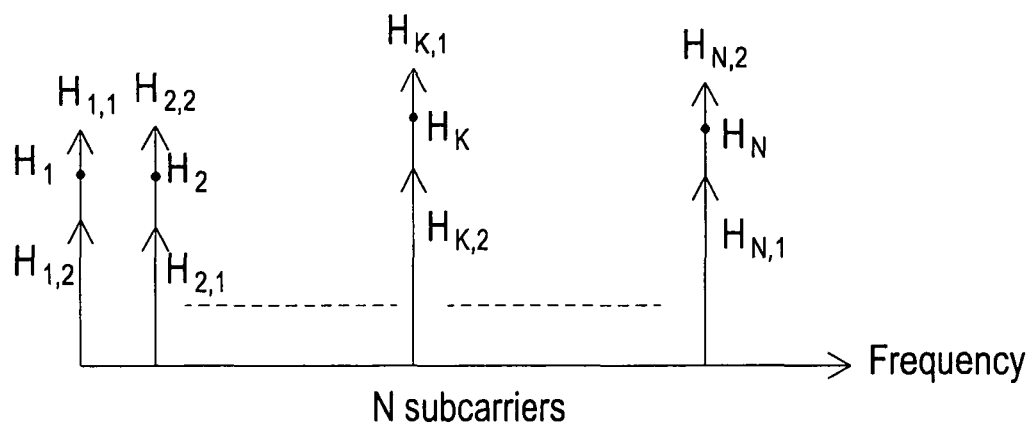
FIG. 3 is a schematic view showing the estimated subcarrier gain value $H_k$ for all subcarriers.

Moreover, to obtain a measure that is much closer to the actual gain value of the subcarrier, the aforementioned two parameters are further averaged to calculate an estimated subcarrier gain value $H_k$ as shown in FIG. 3. The calculation for the estimated subcarrier gain value $H_k$ is as shown by the equation $$H_k = \frac{H_{k,1} + H_{k,2}}{2}.$$

By summing up all the absolute values of all estimated subcarrier gain values ($H_k$) of all subcarriers, the entire channel gain value (A) is obtained. The estimation of the channel gain value is expressed with an equation $$A = \sum_{k=1}^{N} |H_k|.$$

In order to represent the influence on the channel resulted from the multipath, a fading value (F) is further taken into consideration. The fading value is derived by the relationship $$F = \sum_{k=1}^{N} \left| |H_k| - \frac{A}{N} \right|$$

in which the ratio of the estimated channel gain value (A) to the total quantity of the subcarriers (N) stands for an average subcarrier gain value for each subcarrier. Actually, the difference in quantity between the estimated subcarrier gain value $H_k$ and the average subcarrier gain value $$\frac{A}{N}$$

can be deemed as a deviation. Therefore, the fading value (F) for the channel can be calculated simply by accumulating the absolute values of all deviations.

As described above, parameters including the estimated channel gain value (A), the fading value (F) and the noise quantity (B) of the channel are all calculable based on the subcarrier gain values $H_{k,1}$ and $H_{k,2}$. After said three parameters (A, F, and B) are obtained, the link quality (LQ) of the channel can be defined as $$LQ = \frac{(A-F)}{B}.$$

As shown in the link quality equation, if the fading value is not taken into account, only the ratio of parameter (A) to (B) is considered, which substantially represents a signal-to-noise ratio of the evaluated channel. However, since the fading value is provided in that equation, even when a channel has great variation in channel gains, the link quality can very precisely be estimated according to the method of the present invention.

Figure 4:
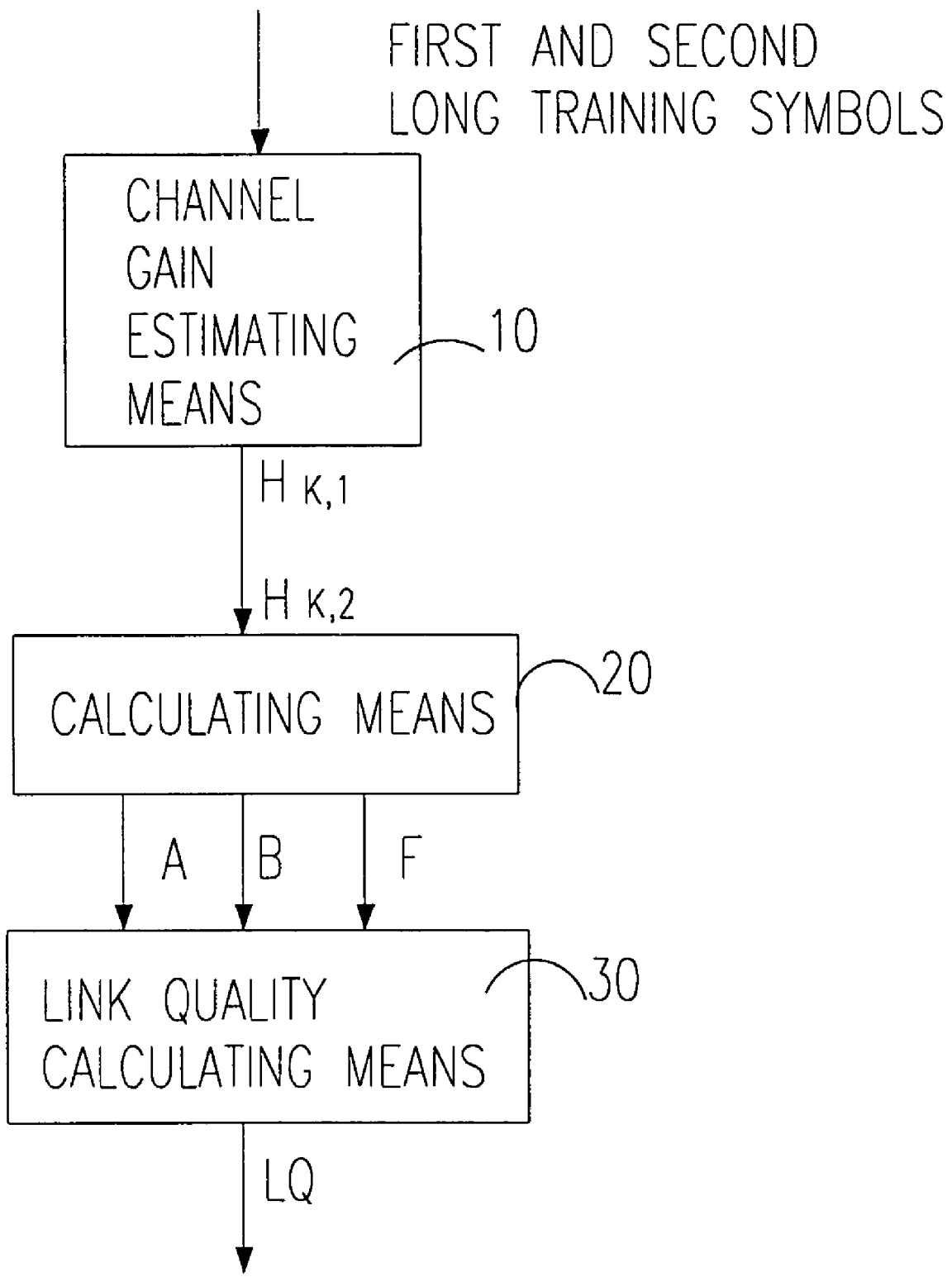
FIG. 4 is a block diagram of a link quality estimating apparatus in accordance with the present invention.

Moreover, the link quality estimating method described above is able to be implemented with such an apparatus as shown in FIG. 4. The apparatus includes a channel gain estimating means (10), a calculating means (20) and a link quality calculating means (30).

The channel gain estimating means (10) is for estimating the first and the second subcarrier gain values ($H_{k,1}$, $H_{k,2}$) for each subcarrier based on said two sequentially received long training symbols of a received OFDM packet.

The calculating means (20) computes the noise quantity (B), the fading value (F) and the estimated channel gain value (A) based on foregoing equations.

With the calculated parameters, the link quality calculating means (30) further computes the link quality (LQ) of the channel upon the relationship $$LQ = \frac{(A-F)}{B}.$$

In conclusion, the purpose of the present invention is to introduce a fading value to modify the estimated link quality thereby considering the real conditions of the estimated channel.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method of estimating the link quality of a channel composed of subcarriers over which OFDM packets are transmitted, the method comprising the steps of:
   estimating a noise quantity (B) of said channel based on two long training symbols contained in a received OFDM packet transmitted over said channel;
   summing the absolute values of estimated subcarrier gain values ($H_k$) of said subcarriers thereby obtaining an estimated channel gain value (A) of said channel;
   estimating a fading value (F) of said channel based on said estimated subcarrier gain values; and
   subtracting said fading value (F) from said estimated channel gain value to derive a channel gain measure (A-F), whereby the link quality of said channel is defined as a ratio of the channel gain measure (A-F) to the noise quantity (B).

2. The method as claimed in claim 1, the noise quantity estimating step further comprising:
   receiving the first of said two long training symbols from said channel to obtain a first subcarrier gain value $H_{k,1}$ for each of said sub-carriers, where k denotes the sub-carrier index;
   receiving the second of said two long training symbols from said channel to obtain a second subcarrier gain value $H_{k,2}$ for each of said subcarriers; and
   estimating the noise quantity according to the relationship $$B = \sum_{k=1}^{N} |H_{k,1} - H_{k,2}|,$$

where N is the quantity of said subcarriers.

3. The method as claimed in claim 2, wherein said estimated subcarrier gain value ($H_k$) of each subcarrier is calculated based on said first and second subcarrier gain values.

4. The method as claimed in claim 3, wherein said estimated subcarrier gain value ($H_k$) of each subcarrier is an average value of said first and second subcarrier gain values.

5. The method as claimed in claim 2, wherein said fading value (F) is calculated according to the relationship $$F = \sum_{k=1}^{N} \left| |H_k| - \frac{A}{N} \right|.$$

6. The method as claimed in claim 3, wherein said fading value (F) is calculated according to the relationship $$F = \sum_{k=1}^{N} \left| |H_k| - \frac{A}{N} \right|.$$

7. The method as claimed in claim 4, wherein said fading value (F) is calculated according to the relationship $$F = \sum_{k=1}^{N} \left| |H_k| - \frac{A}{N} \right|.$$

8. An apparatus for estimating the link quality of a channel composed of subcarriers, said apparatus comprising:
   channel gain estimating means for estimating a first and a second subcarrier gain values ($H_{k-1}$ $H_{k-2}$) for each subcarrier based on two sequentially received long training symbols of a received OFDM packet;
   calculating means for calculating a noise quantity (B), a fading value (F) and an estimated channel gain value (A) based on said first and second subcarrier gain values; and
   link quality calculating means for calculating the quality of said channel, wherein said link quality calculating means performs a subtraction of said fading value from said estimated channel gain value (A-F) to derive a modified channel gain value, whereby the quality of said channel is defined as a ratio of the modified channel gain value (A-F) to the noise quantity (B).

9. The apparatus as claimed in claim 8, wherein said calculating means calculates the noise quantity (B) based on relationship $$B = \sum_{k=1}^{N} |H_{k,1} - H_{k,2}|,$$

where N is the quantity of said sub-carriers.

10. The apparatus as claimed in claim 8, wherein said calculating means further calculates an average value of said first and second subcarrier gain values ($H_{k,1}$ $H_{k,2}$) as an estimated subcarrier gain value ($H_K$) for each subcarrier.

11. The apparatus as claimed in claim 10, wherein said estimated channel gain value (A) is derived by summing the absolute values of said estimated subcarrier gain values ($H_k$).

12. The apparatus as claimed in claim 10, wherein said fading value (F) is calculated according to the relationship $$F = \sum_{k=1}^{N} \left| |H_k| - \frac{A}{N} \right|,$$

where N is the quantity of subcarriers.

13. The apparatus as claimed in claim 11, wherein said fading value (F) is calculated according to the relationship $$F = \sum_{k=1}^{N} \left| |H_k| - \frac{A}{N} \right|,$$

where N is the quantity of subcarriers.

* * * * *